Figure 1:
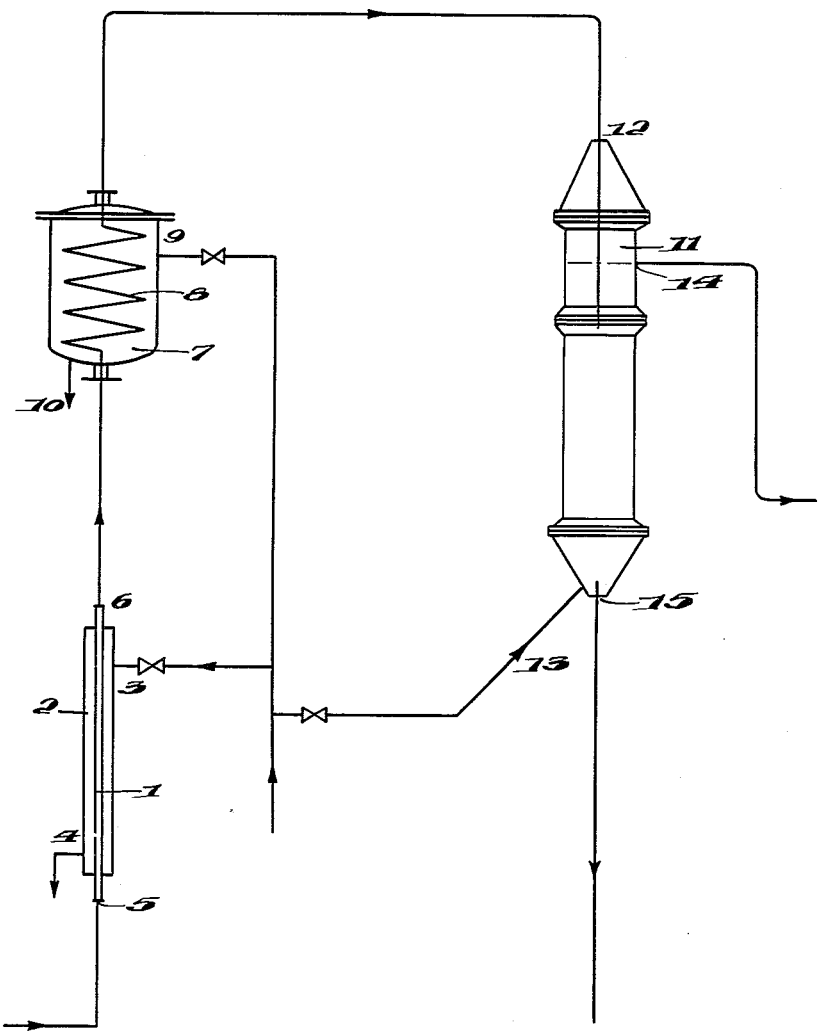

May 15, 1956 J. MÜLLER 2,745,719
HYDROGEN PEROXIDE PRODUCTION
Filed April 25, 1952 2 Sheets-Sheet 1

INVENTOR
JOSEF MÜLLER,

BY *Bailey, Stephens & Huettig*
ATTORNEYS

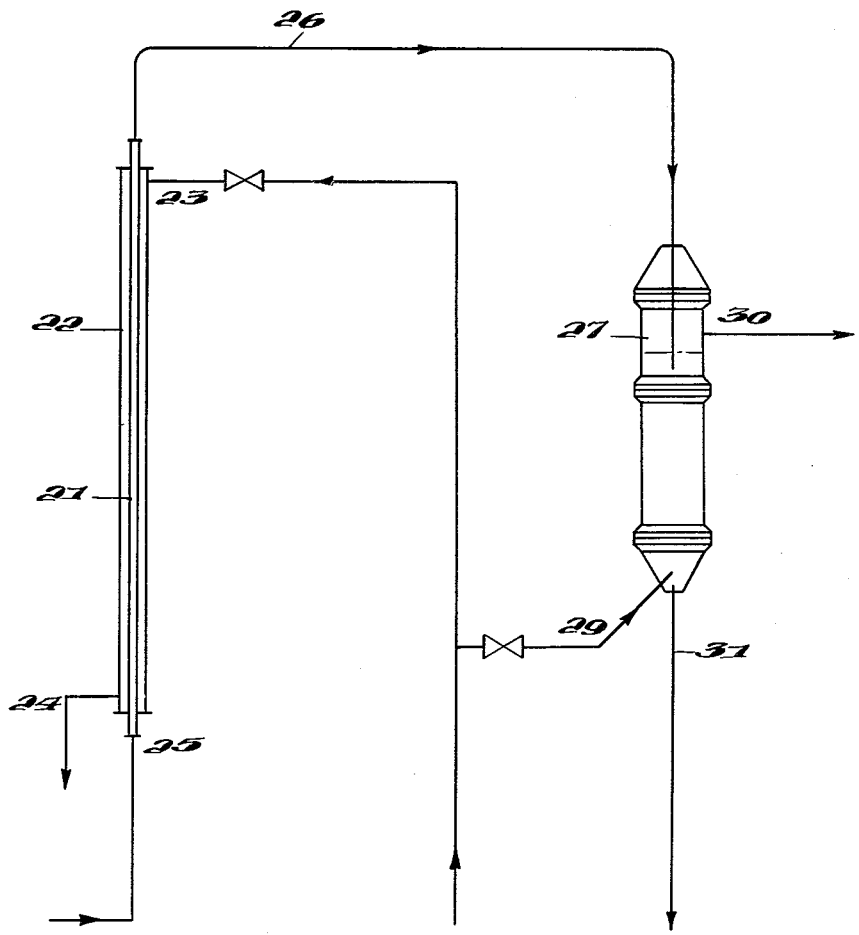

2,745,719

HYDROGEN PEROXIDE PRODUCTION

Josef Müller, Paternion, Austria, assignor to Deutsche Gold- und Silber-Scheideanstalt vormals Roessler, Frankfurt am Main, Germany Application April 25, 1952, Serial No. 284,217

Claims priority, application Germany April 28, 1951

11 Claims. (Cl. 23—207)

The present invention relates to a novel process and apparatus for the production of hydrogen peroxide from persulfuric compounds such as persulfuric acid and its salts by hydrolysis of such compounds followed by distillation of the hydrolysed solution.

A number of processes and apparatus for the production of hydrogen peroxide by hydrolyzing persulfuric compounds followed by distillation of the hydrolysed solution are already known, but in view of the corrosive materials involved and in view of the tendency of hydrogen peroxide to decompose in the presence of impurities, these known processes and apparatus left much to be desired, both as to yield and purity of the hydrogen peroxide produced, as well as with regard to the life of the apparatus employed.

It is an object of the invention to provide a process for the production of hydrogen peroxide from persulfuric compounds which process enables the recovery of hydrogen peroxide of high purity with good yields and with low heat energy requirements.

It is another object of the invention to provide a novel apparatus for the production of hydrogen peroxide from solutions of persulfuric compounds.

In accordance with the invention, it was unexpectedly discovered that hydrogen peroxide of high purity and with good yields can be achieved if at least the hydrolytic decomposition of the persulfuric compounds and at least a portion of the distillation is carried out in an apparatus the parts of which are in contact with acid solutions of the persulfuric compounds or their vapors are wholly or partly constructed of graphite. Contrary to expectations, it was found that the strongly oxidizing solutions occurring during such hydrolysis do not, as is the case with nitric acid, attack graphite to form graphitic acids with attendant corrosion of the apparatus and decomposition of the solution which is in contact with the graphite. Graphite has the advantage that it is substantially inert with respect to the reaction solutions and consequently corresponds in every respect to the ceramic materials previously employed and, furthermore, that it has a relatively high heat conductivity. The combined high heat conductivity and inertness of the graphite renders it possible to obtain a rapid concentration of the reaction solution to the acid concentration necessary for the hydrolysis of the persulfuric compounds under relatively mild conditions. The high heat conductivity of the graphite also renders it possible to employ relatively low steam pressures and to reduce the steam requirements for the production of hydrogen peroxide considerably. For example, the steam requirements for the process according to the invention are about 15 to 18 kg. of steam per kg. of 100% hydrogen peroxide, whereas the older processes require at least 30 kg. of steam per kg. of hydrogen peroxide.

Preferably the velocity of the reaction solution through the apparatus constructed of graphite is at least 50 ccm./minute per cm.² of interior cross section.

The process according to the invention can be carried out in two steps in the first of which the persulfuric acid is completely hydrolysed to hydrogen peroxide and partially distilled in a graphite apparatus, the reaction solution and the vapors evolved being passed concurrently through the graphite apparatus and in the second of which the reaction solution and vapors are treated directly with steam to drive off the hydrogen peroxide.

It has been found especially advantageous to carry out the process according to the invention in three successive steps whereby a particularly acid-free product is obtained with good distillation yield and low heat requirements. In such three-step process, the hydrolysis of the persulfuric acid to Caro's acid and a partial hydrolysis of the latter to hydrogen peroxide is effected as rapidly as possible in the first step whereby the greater part of the concentration of the reaction solution is effected. The rapidly progressing hydrolysis in such first step renders it possible substantially to avoid decomposition reactions which deleteriously affect the yield of hydrogen peroxide ultimately obtained. This first step is carried out in an inert apparatus substantially composed of graphite which permits the rapid heat transfer which is necessary to effect the rapid hydrolysis and concentration.

In the second step of the three-step process, the main portion of the hydrogen peroxide is distilled off from the reaction solution under as mild conditions as possible, namely, with a slow and low supply of heat. The time required for the second step is substantially greater, preferably 3 to 7 times as great as for the first step. In the first two steps, the heat required is supplied indirectly, preferably with indirect steam.

In the third step of the three-step process, the remaining portion of the hydrogen peroxide in the reaction solution is driven off by the direct introduction of steam. Preferably the distillation of the hydrogen peroxide is carried as far as possible in the second step of the three-step process in order that the steam requirements for the third step be kept as low as possible.

Preferably the steam employed to provide the heat requirements for the three-step process is low-pressure steam, for example, at gauge pressures of 0.2 to 1 atmosphere. The use of steam at gauge pressures between 0.3 and 0.6 atmosphere has been found especially advantageous to reduce the steam requirements to a minimum.

In a preferred modification of the three-step process, at least 30%, expediently 30–40% of the original volume of the reaction solution is evaporated in the first step, whereas only about a 10%–20% reduction in volume of the solution (with reference to its original volume) is effected by evaporation in the second step so that after completion of the second step the original liquid volume has been reduced by about 50%. As the distillation of hydrogen peroxide is the main purpose of the second step, it is important that at least 70% and preferably at least 80% of the hydrogen peroxide is distilled off in this step, whereas only minor portions, for example, between 5 and 30% are distilled off in the first step in order to avoid the danger of deleterious decompositions as well as to avoid corrosive attack upon the evaporation as much as possible.

The following table illustrates the liquid distilled off and the proportion of the hydrogen peroxide distilled in the respective steps.

|  | Distilled Liquid Vol. | Distilled $H_2O_2$ |
|---|---|---|
|  | Percent | Percent |
| Step 1 | 36.05 | 20.2 |
| Step 2 | 50.80 | 80.5 |
| Step 3 | 47.40 | 94.0 |

This table illustrates that the major portion evaporation concentration is effected during the first step, whereas the major portion of the distillation of the $H_2O_2$ is effected in the second step and that upon driving off the residual quantities of $H_2O_2$ in the third step, distillation yields substantially over 90% are obtained.

In view of the different periods of time required for the individual steps as well as the different heat requirements in the various steps, it has been found advisable to select the material for the apparatus employed in each of the steps especially for the evaporators and columns as well as the conduits with a view to the requirements of each step. As the first step requires rapid heat transfer to the reactants during the short period of time the reactants remain in this step, it was found that graphite was most suitable for the construction of the apparatus employed in such step.

As the second step requires relatively mild conditions employing the lowest amount of heat possible, it was found advantageous to employ an apparatus of relatively low heat conductivity to avoid the possibility of local overheating as much as possible and to permit good temperature regulation of the reaction solution over the long path it takes during this step. It has been found that lead apparatus or lead alloy such as hard lead is especially suitable for this step as they are sufficiently corrosion resistant and do not have any substantial decomposition effect upon the reaction mixture under the conditions employed. In order that the reaction mixture remain in the second step for a longer time than in the first step, the rate of flow of the reaction mixture can be diminished by increasing the cross section of the conduit or conduits through which it flows or the path of flow can be materially increased, or if desired, both of these measures can be employed.

As the residual hydrogen peroxide contained in the reaction solution is to be driven out by the direct application of steam, it has been found desirable to employ an apparatus constructed of material of low heat conductivity therefor. It has been found that apparatus of ceramic material is well suited and that large heat losses can be avoided thereby.

The materials for the apparatus for the three steps are therefore preferably selected so that their heat conductivity decreases from the first to the third steps.

In order that the heat exchange surfaces be better utilized, it has been found advantageous to arrange the evaporators employed in the first and second steps in such a way that the reaction liquid and distillation products flow through them concurrently and to arrange the column employed in the third step so that the vapors are removed in such a manner that they flow countercurrent to the liquid passed therethrough. Furthermore, it has been found advantageous to introduce the persulfuric compound solution into the lower end of the evaporator employed in the first step. In the second step, it has been found immaterial whether the reaction mixture is passed upwardly or downwardly through the evaporator. Preferably the evaporator employed in the second step is constructed as a coiled tube in order to provide the necessary length of path for the reaction mixture without undue space requirements.

In the accompanying drawings:

Fig. 1 diagrammatically shows an apparatus for carrying out the preferred three-step process according to the invention, and;

Fig. 2 diagrammatically shows an apparatus in which the process according to the invention is carried out in two steps.

Referring to Fig. 1, an evaporator tube 1 constructed of graphite is fitted with a steam jacket 2 into which steam is introduced through pipe 3. The stream and condensed steam are withdrawn from the jacket through conduit 4. The solution containing the persulfuric compounds is introduced into the evaporator tube 1 through conduit 5 and the heated hydrolysed solution leaves tube 1 together with the vapors formed through conduit 6 and is introduced into evaporator 7 which is provided with a steam jacketed coiled tube 8, preferably of lead or lead alloy. The steam required for heating the evaporator 7 is introduced through conduit 9 and withdrawn through conduit 10. The liquid and vapor leaving evaporator 7 are introduced into the upper portion of a stripping column 11, which is partially filled with filling bodies, such as, Raschig rings, below the upper surface of the filling bodies through conduit 12. Steam is blown into the bottom of the column through conduit 13. The resulting vapors are withdrawn from the upper portion of column 11 through conduit 14, whereas the distillation residue leaves the bottom of the column through conduit 15.

Referring to Fig. 2, an evaporator tube 21 constructed of graphite somewhat longer than that of Fig. 1 is fitted with a steam jacket 22 into which steam is introduced through conduit 23. The steam and condensed steam are withdrawn from the jacket through conduit 24. The solution containing the persulfuric compounds is introduced into the evaporator tube 21 through conduit 25 and heated hydrolysed solution leaves tube 21 together with the vapors formed through conduit 26 and are introduced thereby into the upper portion of column 27, which is partially filled with filling bodies, such as, Raschig rings, below the upper surface of the filling bodies. Steam is blown into the bottom of the column through conduit 29. The resulting vapors are withdrawn from the upper portion of column 27 through conduit 30, whereas the distillation residue leaves the bottom of the column through conduit 31.

As the production of hydrogen peroxide by the hydrolysis of persulfuric compounds followed by distillation is normally carried out under reduced pressure, it has been found desirable to reduce the porosity which may be encountered in the graphite tubes employed in the portion of the apparatus wherein the persulfuric compounds are hydrolysed and partial distillation takes place, to prevent escape of the reaction mixture or its dilution with steam or condensed steam. The application of thin dense coatings of metals such as lead or gold upon the exterior have been found expedient for this purpose. It has also been found that reliable imperviousness of the graphite can be obtained by filling the pores thereof with materials which are inert with respect to the reactants. For this purpose, it has been found suitable to impregnate the porous graphite tubes, advantageously under vacuum, with barium chloride and thereafter impregnating the tubes with sulfuric acid whereby barium sulfate precipitates in and closes the pores. The sealing action of barium sulfate can be assisted by also impregnating the graphite tubes with water glass followed by acid impregnation to precipitate finely divided silica in the pores. A treatment which has been found especially advantageous in sealing the pores of the graphite tubes is a combined treatment of the tubes with cold and hot barium chloride solutions, sulfuric acid and water glass. Preferably an impregnation with hot dilute sulfuric acid is employed as the last step. When tubes thus treated are subsequently coated or impregnated with a varnish especially containing an acid and heat resistant synthetic resin such as a dissolved polyvinyl compound, the sealing of the pores is improved by the swelling action of the acid retained in the pores upon the varnish.

The following examples will illustrate the manner in which the process according to the invention can be carried out.

Example 1

Graphite tubes 1.5 meters long having an inside diameter of 30 mm. and an outside diameter of 40 mm. were treated several times alternately with a barium chloride and sulfuric acid under vacuum in order to insure as complete an impregnation as possible. The resulting barium sulfate precipitate filled and sealed the pores.

Three of such treated graphite tubes were joined with the aid of polyvinyl tube joints to form a tube 4.5 meters long. Other joining means, for example, gold, tantalum, platinum and similar corrosion-resistant metals could also be employed. The joined tubes were placed in a steam jacket which was heated with steam at 0.4 atmosphere gauge pressure and 0.8 liter per minute of a persulfuric acid solution containing 300 grams of $H_2S_2O_8$ per liter were introduced into the bottom of the joined graphite tubes. The heated hydrolysed reaction solution together with the vapors formed leaving the top of the joined tubes were passed into the upper portion of a porcelain stripping column 2 meters high and 300 mm. interior diameter filled with 25 mm. Raschig rings through a hard glass tube which introduced the liquid vapor mixture below the upper surface of the Raschig ring filling to prevent spattering and in order that all acid droplets be retained by the Raschig rings. Direct steam was introduced into the bottom of the filled column and the resulting vapors were continuously withdrawn from the top of the column and the distillation residue was continuously withdrawn from the bottom of the column. The distillation was carried out under a pressure of 50 mm. Hg.

While the persulfuric acid passed through the joined graphite tubes, it was condensed from a specific gravity of 1.330 to a specific gravity of 1.550 and 40 to 45% of the active oxygen content was transformed in vapor form $H_2O_2$. The hydrolytic decomposition of the persulfuric acid and the Caro's acid was complete before the reaction mixture left the graphite tubes and the remaining $H_2O_2$ was easily driven off in the steam distillation column in view of the high acid concentration. A very pure $H_2O_2$ containing only 0.02 gram of $H_2SO_4$ per 100 cc. with reference to 35% concentration was obtained. The decomposition losses were only 5% and less and even solutions containing relatively large quantities of catalytic substances could be employed to provide high yields of $H_2O_2$. The temperature in the column was 85° C. at the indicated pressure of 50 mm. Hg. The velocity of flow of the persulfuric acid solution through the graphite tube was 113 cc. per minute per cm.² of the interior cross section of the tube.

*Example 2*

Two graphite tubes 1.5 meters long and having an interior diameter of 27 mm. and an exterior diameter of 40 mm. were treated with a barium chloride solution and sulfuric acid as in Example 1 and were then provided with an exterior electrolytic lead coating. These tubes were joined with a polyvinyl tube to produce a graphite tube 3 meters long and arranged in a steam jacket in an apparatus as disclosed in Fig. 1. The upper end of the graphite tube was connected by means of a glass tube to a coiled hard lead tube 4 meters long and having an interior diameter of 40 mm. and an exterior diameter of 60 mm. arranged in a steam jacket. Steam was supplied to the steam jackets for the graphite and lead tubes at a pressure of 0.35 atmosphere gauge pressure. The other end of the lead tube was connected to a stripping column as in Example 1. The distillation was carried out at a pressure between 50 and 60 mm. Hg. The temperature in the column reached 85–87° C.

0.9 liter per minute of an ammonium persulfate containing persulfuric acid solution which contained 350 g. active oxygen calculated on $H_2S_2O_8$ per liter were introduced into the bottom of the graphite tube whereby a velocity of 157 ccm. per minute per cm.² of interior cross section of the graphite tube. In passing through the graphite tube the solution was concentrated to 72% of its original volume and at the same time 35% of the active oxygen was evaporated as $H_2O_2$. A further concentration of the solution to 50% of its original volume was effected in the lead tube and upon leaving the lead tube about 80% of the active oxygen originally contained in the reaction solution was evaporated as $H_2O_2$. The remaining active oxygen was driven out in the porcelain column with direct steam. A very pure $H_2O_2$ resulted containing only 0.015 gram $H_2SO_4$ per 100 ccm. with reference to 35% concentration was obtained. The decomposition losses were only 5%. The distillation conditions were so favorable that the acid solution used could be recycled after electrolysis without purification for months without danger of catalytic decomposition losses. The iron content thereof can, for example, amount to more than 10 mg. per liter.

In large scale technical production, it has been found suitable to connect several graphite evaporators or several graphite and lead tube evaporators to one larger stripping column.

While graphite is the preferred construction material for the first evaporator employed to concentrate and hydrolyse the persulfuric compound solutions, it can also be employed for other portions of the apparatus. The conduits employed to connect the various evaporators can be of any suitable inert material. As heat conductivity of such conduits plays no material role, they can be of relatively non-heat conductive material such as glass or ceramics, or they may be of corrosion-resistant metals such as gold, platinum, platinum gold alloys, stainless steel, tantalum and the like.

I claim:

1. In a process for the production of hydrogen peroxide by the hydrolysis of a solution of a persulfuric compound selected from the group consisting of persulfuric acid and its salts and the distillation of the hydrogen peroxide formed the steps which comprise passing the persulfuric compound solution through an externally heated graphite tube at a velocity of at least 50 ccm. per minute per cm.² of interior cross-section, and during passage of the solution through the graphite tube indirectly supplying a sufficient amount of heat to evaporate at least 30% of the original volume of the persulfuric compound solution and effect substantially complete hydrolysis of the persulfuric compound while only evaporating a minor portion of the hydrogen peroxide produced and conducting the reaction solution and vapor mixture leaving the graphite tube without previous separation of the vapor from the solution to a stripping column wherein the mixture is treated directly with steam to remove hydrogen peroxide therefrom.

2. A process according to claim 1, in which said tube has been rendered impervious by precipitating at least one of the compounds barium sulfate and silica in the pores of the graphite.

3. The process of claim 1 in which the quantity of hydrogen peroxide evaporated during passage of the solution through the graphite tube is 5 to 45% of that produced.

4. In a process for the production of hydrogen peroxide by the hydrolysis of a solution of a persulfuric compound selected from the group consisting of persulfuric acid and its salts and the distillation of the hydrogen peroxide formed the steps which comprise passing the sulfuric compound solution through an externally heated graphite tube at a velocity of at least 50 ccm. per minute per cm.² of interior cross-section, and during passage of the solution through the graphite tube indirectly rapidly supplying a sufficient amount of heat to evaporate at least 30% of the original volume of the persulfuric compound solution and effect substantially complete hydrolysis of the persulfuric compound while only evaporating a minor portion of the hydrogen peroxide produced, then indirectly supplying heat to the resulting reaction solution and vapor mixture at a slower rate and for a longer period of time to distill off further quantities of the hydrogen peroxide and thereafter passing steam through the resulting solution and vapor mixture to drive off hydrogen peroxide.

5. A process according to claim 4 in which steam at a gauge pressure between 0.2 and 1 atmosphere is employed to supply the heat required for all three steps.

6. A process according to claim 4 in which steam at a gauge pressure between 0.3 and 0.6 atmosphere is employed to supply the heat required for all three steps.

7. A process in accordance with claim 4 in which the distillation in the second step distills off at least 70% of the hydrogen peroxide formed while the liquid volume of the reaction solution is reduced to about 50% with reference to the original volume of the persulfuric compound solution.

8. A process in accordance with claim 4 in which the evaporation in the first step effects at least a 30 to 40% reduction in liquid volume of the reaction solution with reference to the original volume of the persulfuric compound solution and the distillation in the second step distills off at least 80% of the hydrogen peroxide formed while the liquid volume of the reaction solution is reduced to about 50% with reference to the original volume of the persulfuric compound solution.

9. A process according to claim 4, in which the heat supplied to the reaction mixture in the second step is through a material of lower heat conductivity than graphite.

10. A process according to claim 4, in which the second step is carried out while the reaction mixture is confined by a lead base metal.

11. A process according to claim 4, in which the reaction liquid and resulting vapors are lead in concurrent relationship in the first and second steps and steam is passed countercurrently through the reaction liquid in the third step.

References Cited in the file of this patent

UNITED STATES PATENTS

| | | |
|---|---|---|
| 1,013,791 | Lowenstein | Jan. 2, 1912 |
| 1,063,383 | Pietzsch et al. | June 3, 1913 |
| 1,323,075 | Levin et al. | Nov. 25, 1919 |
| 1,670,743 | Schneible | May 22, 1928 |
| 1,924,954 | Muller | Aug. 29, 1933 |
| 1,986,165 | Sieck | Jan. 1, 1935 |
| 2,282,184 | Harrower et al. | May 5, 1942 |

FOREIGN PATENTS

| | | |
|---|---|---|
| 473,344 | Great Britain | Oct. 11, 1937 |

OTHER REFERENCES

Ollinger: "Recent Developments in Carbon Chemical Equipment," Chemical Industry, May 1944, pages 683–688.

Uhlig: "Corrosion Handbook," John Wiley and Sons, 1948, pages 349–351.